United States Patent
Lowe

(10) Patent No.: US 11,388,865 B2
(45) Date of Patent: Jul. 19, 2022

(54) STUMP AUGER

(71) Applicant: Gareth Lowe, Stoney Creek (CA)

(72) Inventor: Gareth Lowe, Stoney Creek (CA)

(73) Assignee: Gareth Lowe

( * ) Notice: Subject to any disclaimer, the term of this patent is extended or adjusted under 35 U.S.C. 154(b) by 453 days.

(21) Appl. No.: 15/976,363

(22) Filed: May 10, 2018

(65) Prior Publication Data

US 2018/0255717 A1 Sep. 13, 2018

Related U.S. Application Data

(63) Continuation-in-part of application No. 14/258,325, filed on Apr. 22, 2014, now abandoned.

(60) Provisional application No. 61/867,688, filed on Aug. 20, 2013, provisional application No. 61/819,113, filed on May 3, 2013.

(51) Int. Cl.
*A01G 23/06* (2006.01)

(52) U.S. Cl.
CPC .................. *A01G 23/067* (2013.01)

(58) Field of Classification Search
CPC .... A01G 23/06; A01G 23/062; A01G 23/065; A01G 23/067; E21B 10/44
USPC ............................................. 144/24.12, 334
See application file for complete search history.

(56) References Cited

U.S. PATENT DOCUMENTS

| | | | | |
|---|---|---|---|---|
| 1,955,768 A | * | 4/1934 | Powell | E21B 10/44 175/388 |
| 2,504,978 A | * | 4/1950 | Henning | E21B 10/44 175/383 |
| 2,575,975 A | * | 11/1951 | Robbins | E21B 10/42 175/391 |
| 2,883,888 A | * | 4/1959 | Stewart | B21K 5/02 76/102 |
| 3,375,890 A | * | 4/1968 | Petersen | E21B 10/44 175/385 |
| 3,379,266 A | * | 4/1968 | Fletcher | E21B 10/32 175/285 |
| 4,127,355 A | * | 11/1978 | Oakes | B23B 51/009 408/220 |
| 4,214,617 A | * | 7/1980 | McKenry | A01G 23/067 144/24.12 |
| 5,360,041 A | * | 11/1994 | Stevens | A01G 23/067 144/218 |
| 5,660,217 A | | 8/1997 | Nissley | |
| 7,137,583 B2 | * | 11/2006 | Kammerer | B02C 13/28 241/294 |

(Continued)

*Primary Examiner* — Jessica Cahill
*Assistant Examiner* — Smith Oberto Bapthelus
(74) *Attorney, Agent, or Firm* — Ridout & Maybee LLP

(57) ABSTRACT

The present concept is a stump auger used for cutting a tree stumps, the stump auger includes a main shaft with a top end for coupling to a drive mechanism for turning the shaft about a vertical axis, wherein the main shaft is connected at a bottom end to a cone top. The stump auger cone includes a spiral thread extending about the outer surface of the cone from the cone top to the cone bottom. The stump auger further includes at least two boring bars connected to the main shaft, each boring bar includes at least two third blades which include a blade edge on a front face for cutting the tree stump as the stump auger is rotated about the vertical axis. Each successive third blade lies along successive planes, each third blade higher along the vertical z-axis.

18 Claims, 13 Drawing Sheets

(56) References Cited

U.S. PATENT DOCUMENTS

| | | | | |
|---|---|---|---|---|
| 7,959,099 | B1* | 6/2011 | Cox | B02C 18/18 |
| | | | | 241/294 |
| 9,137,955 | B1* | 9/2015 | VanDusartz | A01G 23/067 |
| 9,144,804 | B2* | 9/2015 | Kessler | B02C 18/14 |
| D742,422 | S* | 11/2015 | Lowe | B02C 18/18 |
| | | | | D15/21 |
| 9,382,689 | B2* | 7/2016 | Chapman | E02F 3/96 |
| 2009/0087273 | A1* | 4/2009 | Allen | B23B 51/0433 |
| | | | | 408/201 |
| 2013/0056113 | A1* | 3/2013 | Chapman | E02F 3/96 |
| | | | | 144/24.12 |
| 2014/0001297 | A1* | 1/2014 | Kessler | B02C 18/145 |
| | | | | 241/221 |
| 2014/0326362 | A1* | 11/2014 | Lowe | A01G 23/067 |
| | | | | 144/24.12 |
| 2016/0230469 | A1* | 8/2016 | Frost | E21B 10/44 |
| 2016/0374276 | A1* | 12/2016 | Chapman | E02F 9/2253 |
| | | | | 144/24.12 |

* cited by examiner

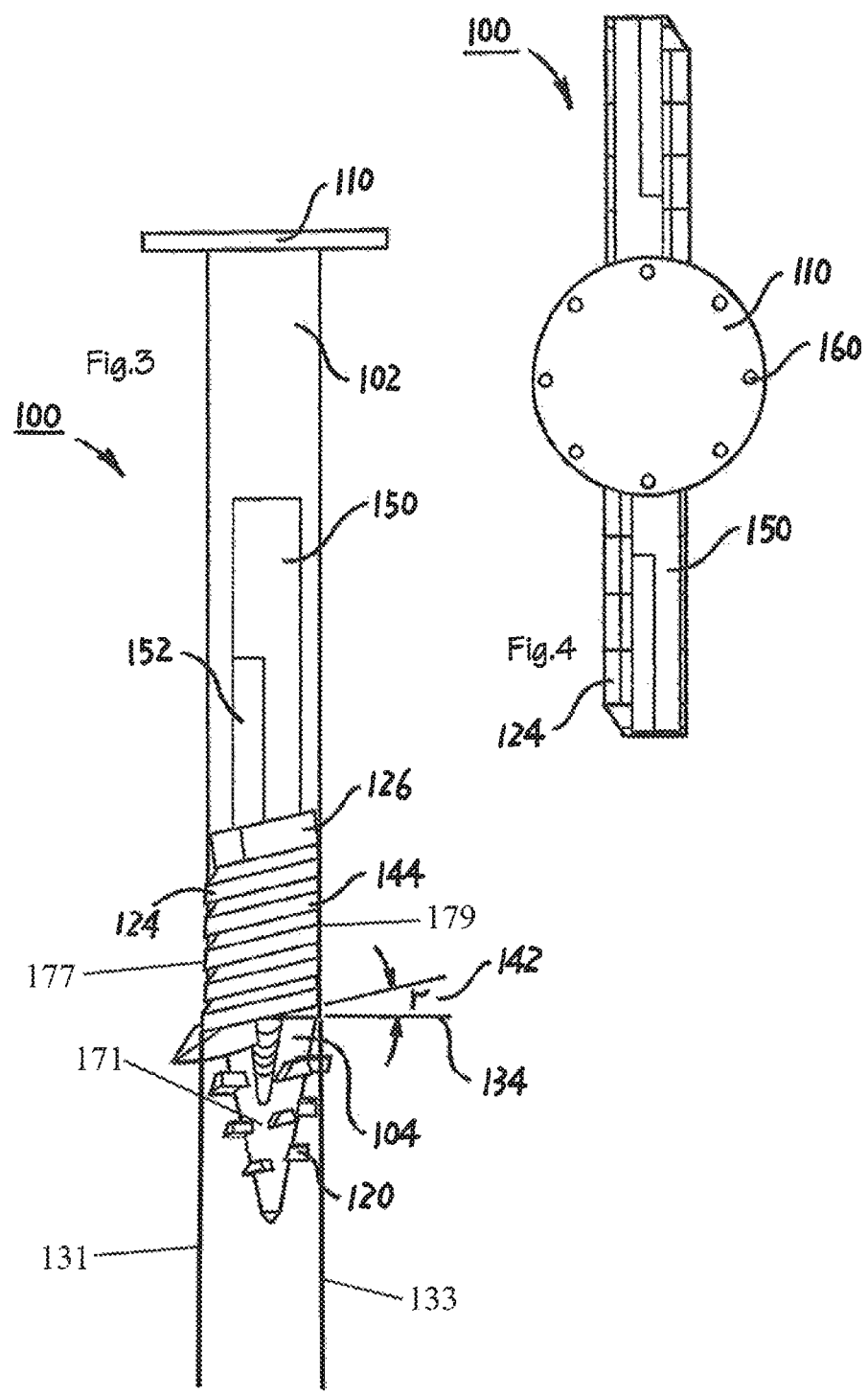

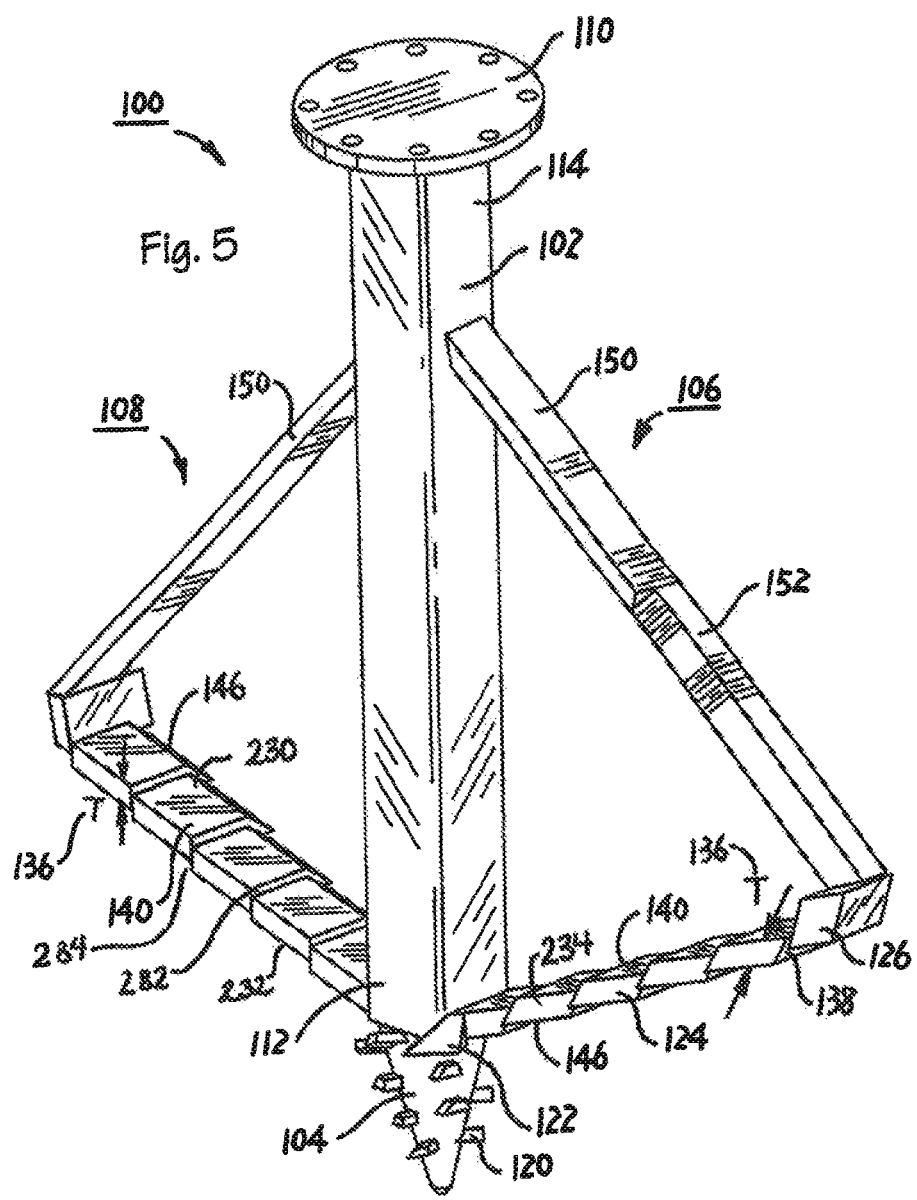

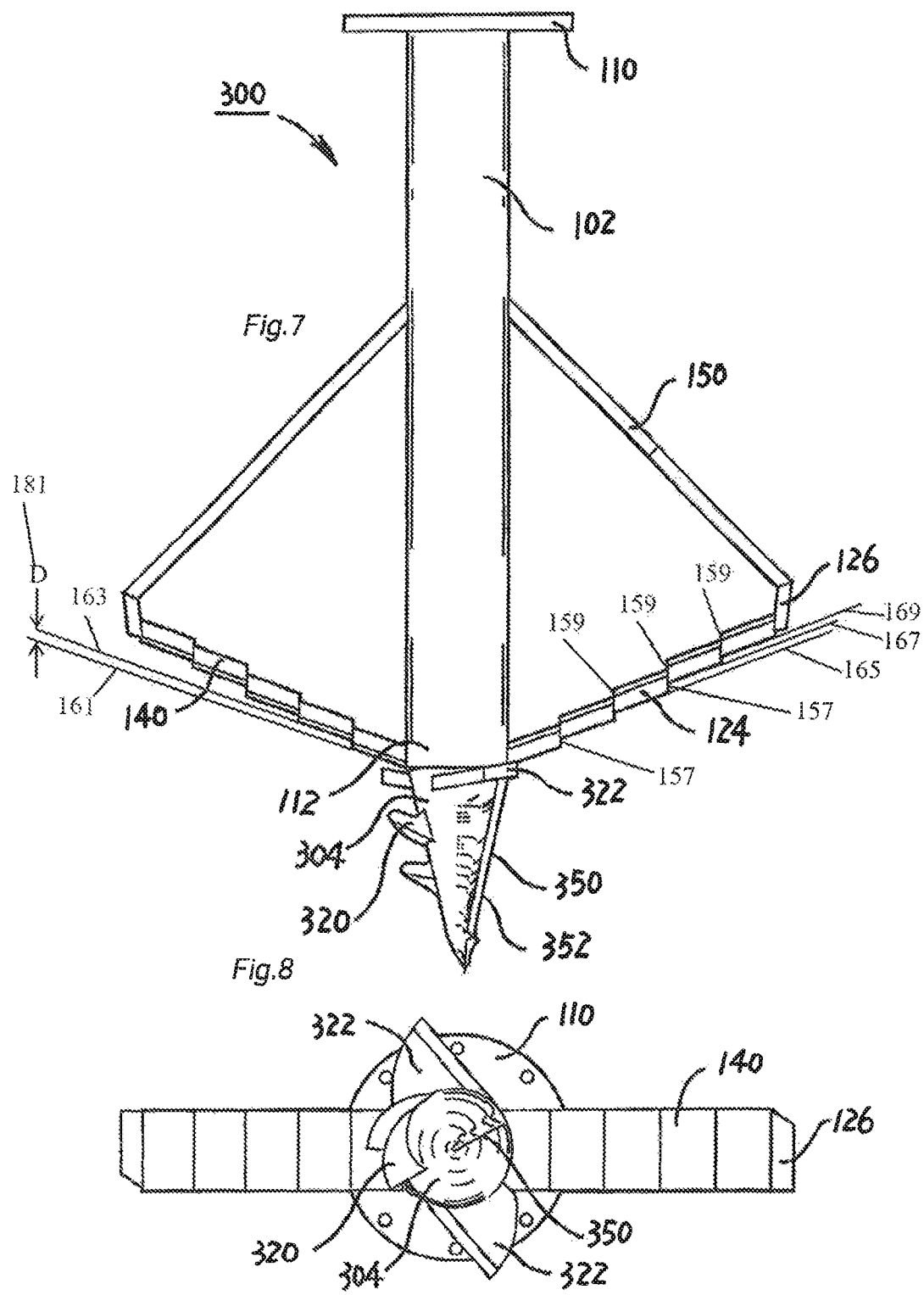

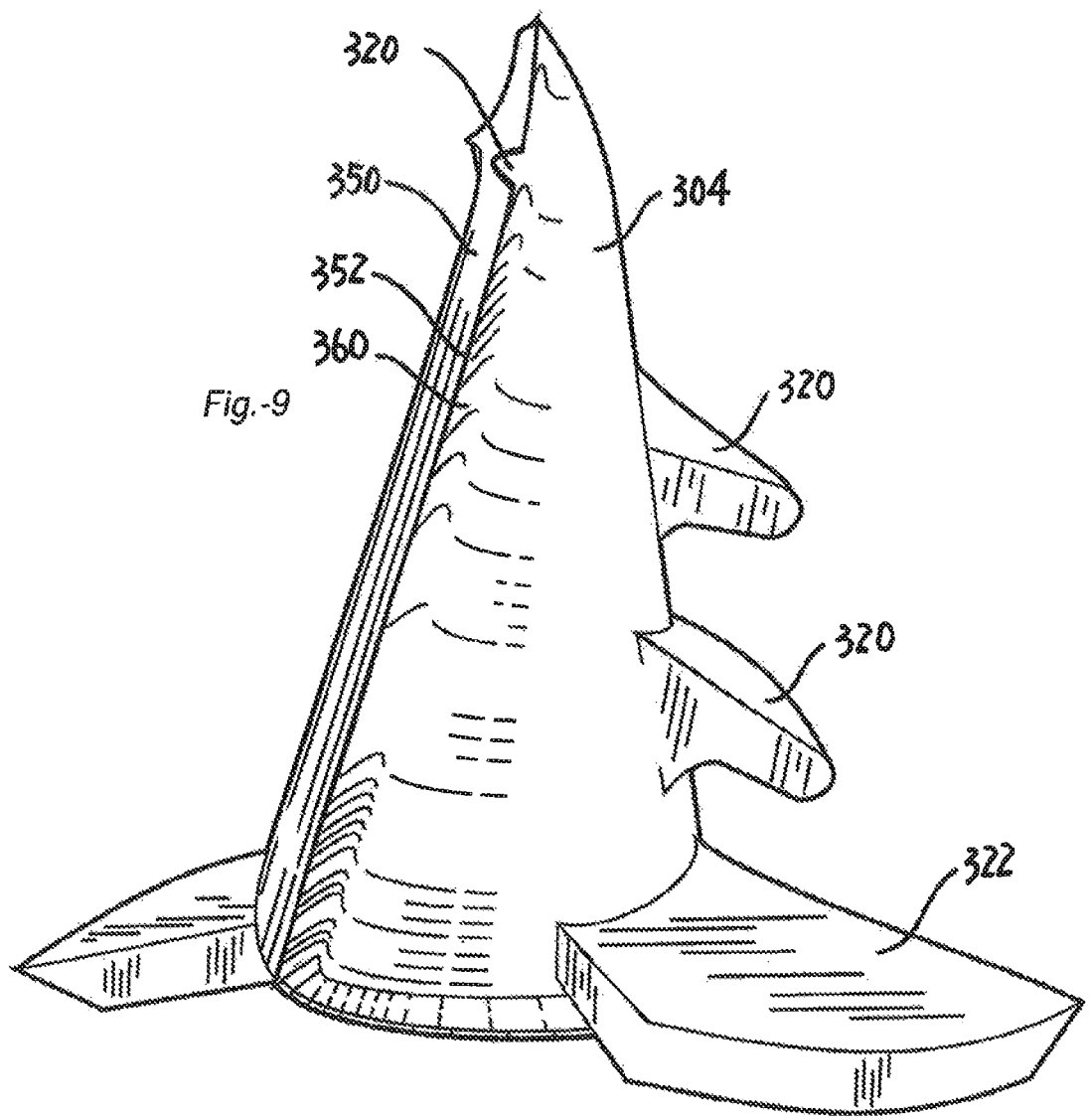

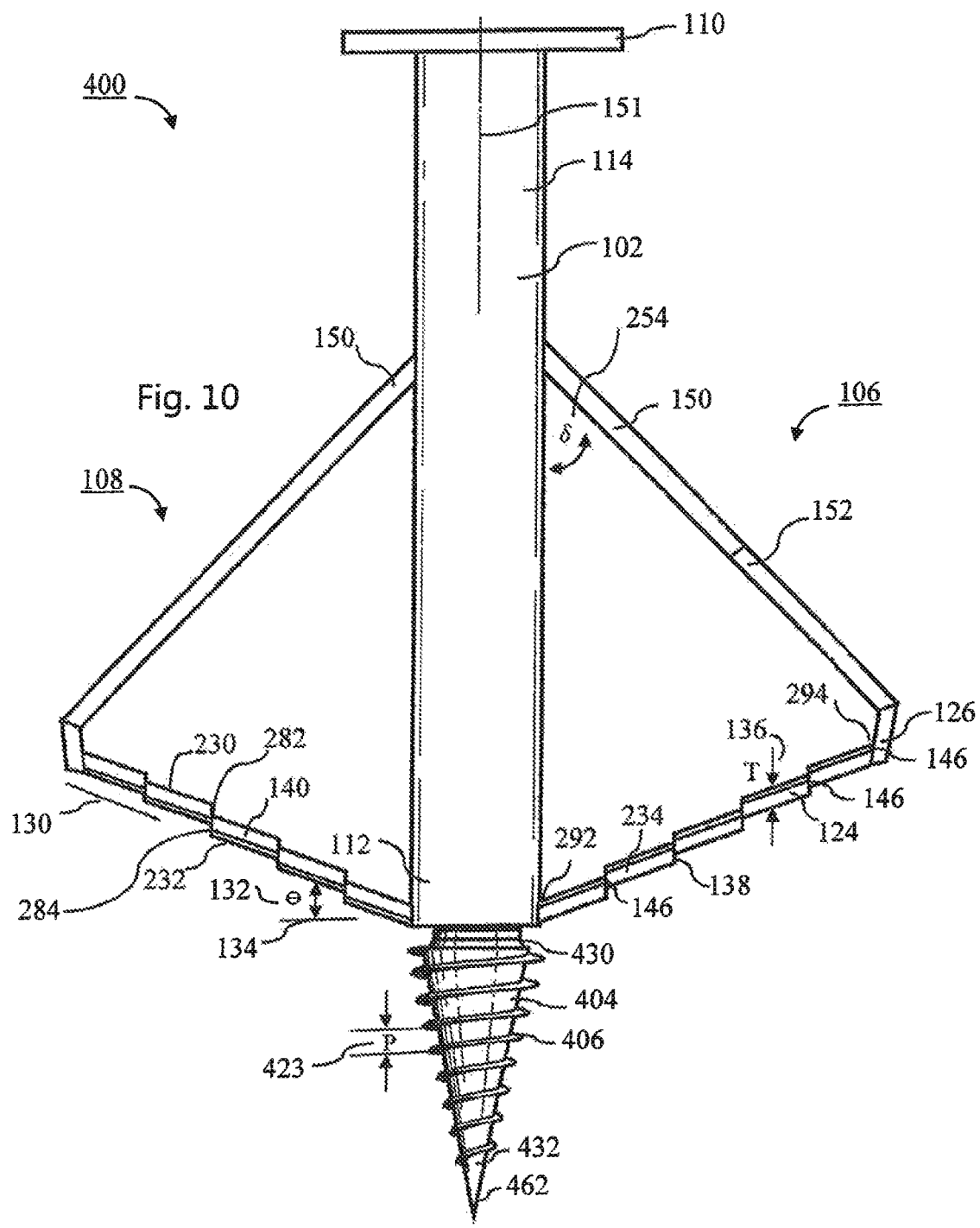

STUMP AUGER

The present application is a continuation in part of U.S. patent application Ser. No. 14/258,325 filed Apr. 22, 2014 by Gareth Lowe under the title STUMP AUGER and also claims priority from U.S. Provisional application 61/819,113 filed on May 3, 2013 by Gareth Lowe under the title stump auger and also U.S. provisional patent application 61/867,688 file on Aug. 20, 2013 by Gareth Lowe under the title STUMP AUGER and incorporate the entire content of these two US provisional patent applications into the present application.

FIELD OF THE INVENTION

The present concept relates to methods and devices for removing stumps and more particularly relates to rotating auger devices used for removing stumps.

BACKGROUND OF THE INVENTION

The conventional stump removal tool is often referred to as a stump grinder. An example of the type of equipment which is generally accepted and used in the industry at this time is depicted in U.S. Pat. No. 5,660,217, inventor Michael C. Nissley titled Stump Grinder which was issued on Aug. 26, 1997. This type of grinder uses a grinding wheel with carbides or hardened steel attached around the outer periphery. The grinding wheel rotates about a horizontal axis and the carbides make contact with the stump thereby grinding away at the wood. The grinding wheel is passed back and forth along the face of the stump thereby grinding more and more of the stump until eventually the entire stump has been chipped away. This process can take anywhere from 10 minutes to over an hour depending upon the size of the stump and the wood species.

The traditional style stump grinder tends to be labour intensive to operate and involves potential hazards due to the speed of rotation of the grinding wheel. For example chips are released and discharged in all directions. Additionally the operator is never certain when he may hit resulting in potential kickback of the machine.

There have been some attempts to develop a stump grinder which rotates not about a horizontal axis but rather about a vertical axis 151 however none of the designs to date have found market acceptance due to their inability to efficiently and effectively remove the stump. One example of a stump grinder which rotates about a vertical axis is shown and depicted in U.S. Pat. No. 5,360,041 inventor H. J. Stevens, under the title Stump Grinder issued on Nov. 1, 1994.

Unfortunately there are a number of drawbacks including slow removal rates, incomplete removal, very high maintenance costs, and lack of efficiency of these devices in effectively removing stumps in a timely and efficient manner.

Therefore there is a need for a stump remover which safely and efficiently removes stumps without the inherent inefficiencies and dangers of the current technology.

SUMMARY OF THE INVENTION

The present concept a stump auger for cutting and destroying a tree stump, the stump auger includes:
a) a main shaft connected at a top end to a drive mechanism for turning the shaft about a vertical axis;
b) the main shaft connected at a bottom end to a cone top, wherein the cone is part of the main shaft;
c) the cone including a spiral thread extending about the outer surface of the cone from the cone top to the cone bottom;
d) the stump auger further includes at least two boring bars connected to the main shaft, each boring bar includes at least two third blades includes a blade edge on a front face for shaving, grinding and chipping the tree stump as the stump auger is rotated about the vertical axis and penetrates the tree stump;
e) wherein each third blade includes a planar bottom surface spaced from a planar top surface, an inner face spaced from an outer face, the front face spaced from a back face, and wherein the outer face of the first third blade abuts at least partially with the inner face of the second third blade such that the bottom surface of the first third blade lies along a first plane A and the bottom surface of the second third blade lies along a second plane B such that plane B is a distance D vertically higher along the vertical z-axis, and wherein successive third blades lie along successive planes each higher along the vertical z-axis.
f) wherein the outer face and inner face of each third blade are rigidly connected together.

Preferably wherein the cone thread has a pitch selected to fall between ½ and 2 inches per revolution.

Preferably wherein the cone thread has a pitch selected to fall between ¾ and 1½ inches per revolution.

Preferably wherein the third blades are oriented parallel along a bar axis having a bar angle theta selected to fall between 10 and 30 degrees relative to horizontal.

Preferably wherein the third blades are stepped at an offset of ¼ to ¾ a thickness T of the third blade.

Preferably wherein the third blades are stepped at an offset of ½ a thickness T of the third blade.

Preferably wherein the third blades include a top surface, a bottom surface and a chamfer terminating at the blade edge, the bottom surface of the third blades tilted at a third blade angle gamma, wherein gamma ranges between 5 and 15 degrees relative the horizontal.

Preferably wherein blade angle gamma preferably oriented at substantially 10 degrees.

Preferably further including fourth blades attached to the outer end of the boring bar, fourth blades include a blade edge mounted substantially vertically.

Preferably wherein the fourth blade is attached at one end to outer end of the boring bar and at the other end to a strut, the strut for stabilizing the boring bar.

Preferably wherein the strut attached at one end to fourth blade and at the other end to the main shaft.

Preferably wherein the strut includes a lower blade portion for additional cutting action.

Preferably wherein the thread includes a maximum height proximate the cone top, and wherein the thread tapers towards the cone bottom.

Preferably wherein the thread maximum height is ¾ of an inch.

Preferably wherein the thread maximum height is ⅜ of an inch.

Preferably wherein the thread taper is defined by angle alpha the angle between the cone outer surface and a line drawn joining the thread apexes, alpha is preferably between 1 and 3 degrees.

Preferably wherein the thread taper is defined by angle alpha which is preferably 2 degrees.

Preferably wherein the thread has a thread profile TP ranging between 30 and 50 degrees.

Wherein the thread profile TP is preferably 40 degrees.

The present concept a stump auger for removing a tree stump, the stump auger comprising:

a) a main shaft connected at a top end to a drive mechanism for turning the shaft about a vertical axis;

b) the main shaft connected at a bottom end to a cone top;

c) the cone including discreet first blades mounted along a thread ridge about the outer diameter of the cone to define a thread;

d) further including second blades attached to the stump auger for shaving, grinding and chipping the tree stump.

Preferably wherein further including third blades attached to the stump auger the third blades for shaving, grinding and chipping the tree stump.

Preferably wherein the thread defined by the first blades has a pitch selected to fall between 0.5 and 4.0 inches per revolution.

Preferably wherein the third blades are oriented along a bar axis having a rise angle theta selected to fall between 10 and 30 degrees relative to horizontal.

BRIEF DESCRIPTION OF THE DRAWINGS

FIG. 3 is a right end side elevational view of the stump auger shown in FIG. 1.

FIG. 4 is a top end view of the stump auger shown in FIG. 1.

FIG. 5 is a front side schematic perspective view of the stump auger shown in FIG. 1.

FIG. 7 is a front side elevational view of an alternate embodiment of a stump auger.

FIG. 8 is a bottom end view of the stump auger shown in FIG. 7.

FIG. 9 is an inverted partial schematic perspective view of the cone used on the stump auger depicted in FIG. 7.

FIG. 10 is a front side elevational perspective view of an alternate embodiment of the present concept namely stump auger 400.

DETAILED DESCRIPTION OF THE PREFERRED EMBODIMENTS

The present concept a stump auger is shown in FIGS. 1 through 5 generally as stump auger 100.

Figure 1:
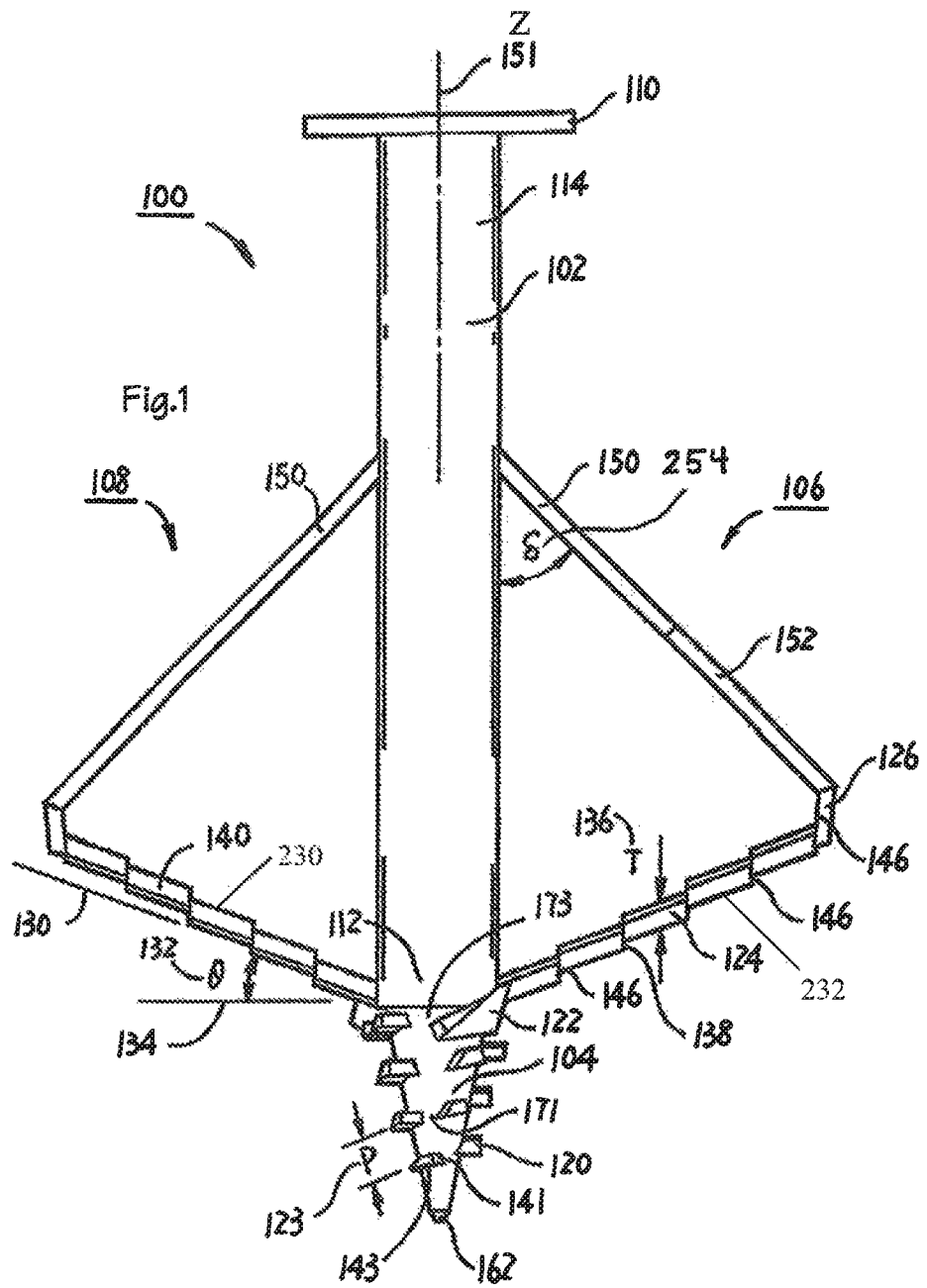
FIG. 1 is a front side elevational view of the present concept a stump auger.

Stump auger 100 includes the following major components namely a main shaft 102, a cone 104, a first arm 106, a second arm 108, and a flange 110. An arm is defined in this application as a strut 150, a fourth blade 126, a number of third blades 124 all oriented as shown in FIG. 1 and connected together and attached at one end to approximately the bottom end 112 of main shaft 102 and at a location close to the top end 114 of main shaft 102, namely where strut 150 attaches to main shaft 102.

Each boring bar includes an inner end 292, and an outer end 294, third blades 124 are mounted in stepped offset side by side fashion such that each successive third blade 124 bottom surface 232 is stepped vertically higher an additional offset 138 amount spaced from bar axis 130 wherein the inner face 282 of one third blade abuts the outer face 284 of the adjacent third blade. Preferably the angle theta 132 defines an angle relative to a horizontal plane 134. Preferably the blade edges 146 of each of the third blades 124 is vertically spaced from and parallel to the bar axis 130 on a vertically higher plane.

Cone 104 is mounted rigidly onto the bottom end 112 of main shaft 102 and flange 110 is mounted rigidly onto the top end 114 of main shaft 102. Preferably stump auger 100 is manufactured of hardened steel however other materials may also be suitable for this application. Cone 104 and flange 110 are fastened to main shaft 102 preferably by welding onto main shaft 102 using conventional welding techniques.

Cone 104 has discreet first blades 120 oriented around a thread ridge 141 of the outer diameter of cone 104 in the same manner as a helical ridge of a wood screw thread is oriented in a helix around the outer body of a screw. In other words first blades 120 define a thread 143, wherein thread 143 is not a continuous helical ridge but rather is made of discreet discontinuous individual first blades 120 positioned where a helical ridge of a thread normally would be positioned. The positioning of first blades 120 is along an imaginary helical ridge of a thread which wraps around cone 104. Thread 143 defined by first blades 120 is discontinuous due to gaps 171 between each blade.

The pitch of this discontinuous thread is indicated as P 123. There are gaps 171 between the first blades 120 to accommodate wood chips and prevent thread 143 from clogging. The gaps 171 prevent the thread from clogging with wood chips and aid to clear wood chips.

In addition to first blades 120 there are also second blades 122 which are located near the top 173 of cone 104 and at the bottom end 112 of main shaft 102. The second blades 122 may be attached to the cone 104, to the main shaft 102 and also possibly to third blades 124 in order to keep them rigidly in place. There may be one or more second blades however the drawings show auger 100 with two second blades 122.

In addition to first blades 120 and second blades 122 there are third blades 124 which are mounted along a bar axis 130 which is oriented at an angle theta shown as bar angle 132 relative to a horizontal plane 134. Third blades mounted in stepped offset side by side fashion parallel to a bar axis 130 which defines a boring bar angle theta 132 relative the horizontal. The third blades including a blade edge 146 for shaving, grinding and chipping the tree stump as the stump auger is rotated about the vertical axis.

Figure 2:
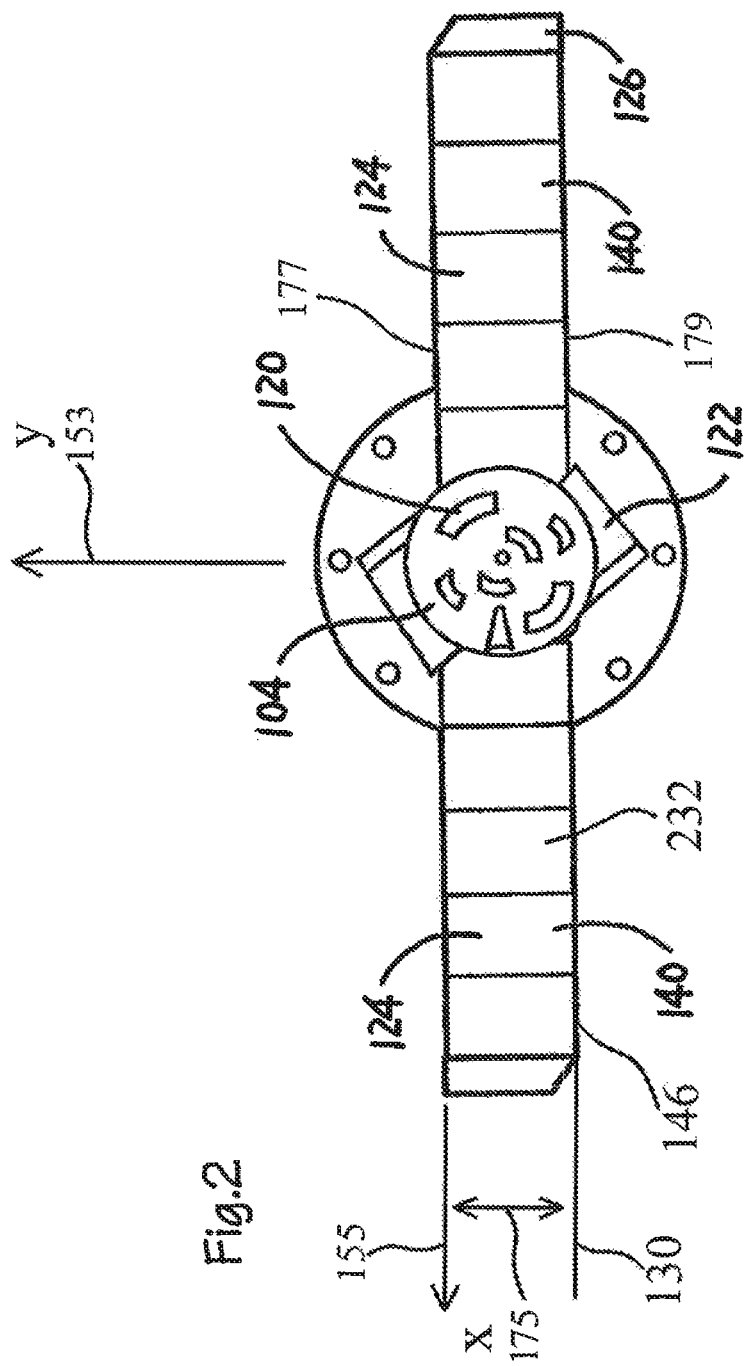
FIG. 2 is a bottom end view of the stump auger shown in FIG. 1.

Third blades 124 also include a top surface 230, a bottom surface 232, outerface 157, inner face 159, front face 171, rear face 173 and a chamfer terminating at blade edge 146. Front face 171 is spaced from back face 173 a distance blade width W 175. In FIG. 2, the y-direction is shown as 153 and the x-direction is shown as 155, thus FIG. 2 lies in the x-y plane. Front face 171 lies along a front blade plane 131 and rear face 173 lies along a rear blade plane 133. Outer face 157 of the first third blade abuts at least partially with the inner face 159 of the second third blade such that the bottom surface 232 of the first blade lies along plane A 161 and the bottom surface 232 of second third blade lies along plane B 163 such that plane B is a distance D 181 vertically higher along the z-axis. Successive third blades lie in plane C 165, plane D 167 and plane E 169.

The stump auger wherein the third blades 124 are oriented parallel along a bar axis having a bar angle theta 132 selected to fall between 10 and 30 degrees relative to horizontal. The stump auger as presently described wherein the third blades are preferably stepped at an offset of ¼ to ¾ the thickness 136 of the third blade and preferably ½ the third blade thickness 136.

Bar angle theta 132 is also called the rise angle. Each individual third blade shown as 124 is rigidly secured to the next in step or staggered fashion as shown with an offset 138 between each of the third blades 124. The offset 138 is the step between adjacent blades 124 as shown. The thickness T of third blades 124 is shown as 136 and the offset 138 is between ¼ and ¾ of the thickness 136 of third blades 124 and preferable is ½ the thickness 136 of third blades 124.

Third blades are also oriented at an angle gamma γ shown as third blade angle 142 in FIG. 3 relative to horizontal plane 134. This is also referred to as a blade tilt 144 which ensures that the blade edge 146 and each individual third blade 124 are mounted at an angle of attack namely gamma γ shown as 142 in FIG. 3 in order to maximize the cutting performance of stump auger 100.

Preferably third blades 124 are welded to each other and are made of hardened steel. It is possible that other materials may work equally as well however in practice the applicant has found that various grades of hardened steel appear to work adequately for the stump auger.

Therefore third blades 124 assembled together along bar axis 130 as shown in FIG. 1 and also in FIG. 5 together define a boring bar shown as 140 which is the assembly of 5 third blades 124 as shown in the diagrams. Third blades 124 are preferably welded together using conventional welding techniques however it may be possible to manufacture boring bar 140 as a single unit by forging or casting processes known in the art.

In practice it is possible to use fewer or more third blades 124 in order to increase or decrease the size of boring bar 140 depending upon its intended use.

Additionally there are fourth blades 126 with the blade edge mounted vertically and attached one end to the boring bars 140 and at the other end to struts 150. Strut 150 also includes a blade portion 152 for additional cutting action. Strut 150 makes an angle delta 254 of between 15 and 60 degrees relative the main shaft 102 and preferable around 30 degrees.

Referring now to FIGS. 7, 8 and 9 which depicts as alternative embodiment namely stump auger 300 which includes most of the same components of stump auger 100 including flange 110, main shaft 102, struts 150, bottom end 112, boring bar 140, fourth blades 126 and third blades 124.

The difference between stump augers 300 and stump auger 100 is the fact that a different cone 304 is used on stump auger 300 versus cone 104 used on stump auger 100.

The major components of cone 304 are first blades 320, second blades, 322, reamer blade 350 which has a cutting edge 352.

Referring now specifically to FIG. 9 which shows cone 304 in an inverted position detached from the main shaft 102 of stump auger cone 304 includes first blades 320, second blades 322, and reamer blade 350 which includes cutting edge 352 and a reamer cavity 360.

Referring now to FIGS. 10 through 15 inclusively an ultimate embodiment to the present invention is depicted as stump auger 400 shown in FIG. 10 and includes all the major components of stump auger 100 shown in FIG. 1 however with a significantly different and modified cone 404 shown in FIG. 10 which replaces cone 104 shown in FIG. 1.

Cone 404 includes a cone top 430 connected to bottom end 112 of main shaft 102. Cone 404 also includes an outer surface 436 and a point 462 at cone bottom 432.

Stump auger 400 includes the following major components namely main shaft 102 having mounted on a bottom end 112 cone 404 and including boring bars 140 which are made up of third blades 124 which are mounted in offset 138 relationship to each other and having a thickness 136 and a blade edge 146 and oriented at an angle theta 132 to the horizontal plane 134 wherein each of the third blades 124 are mounted parallel to a bar axis 130. In other words bar axis 130 relative to the horizontal plane 134 is at an angle theta 132 to the horizontal plane 134.

Third blades 124 are also mounted at a blade tilt 144 which is at an angle gamma shown as 142 in FIG. 3. Main shaft 102 includes a top end 114 having mounted thereon a flange 110 and extends along a vertical axis 115.

The distal ends of each of the boring bars 140 terminates at a fourth blade 126 which has a blade edge 146 which is mounted almost normal or perpendicular to blade edge 146 of each of the third blades 124.

One end of fourth blade 126 is connected to third blades 124 and the end is connected to a first arm 106 which has a blade portion 152.

In all respects other than cone 404 stump auger 400 is identical to stump auger 100 except that is has modified cone 404 which replaces cone 104 and does not include second blades 122.

Therefore all of the features of stump auger 100 described above and depicted in the FIGS. 1 through 6 apply to stump auger 400 except for the design of cone 404 replacing cone 104 and the absence of second blades 122.

Referring now to FIGS. 11 through 15 which show some of the cone 404 details.

Figure 11:
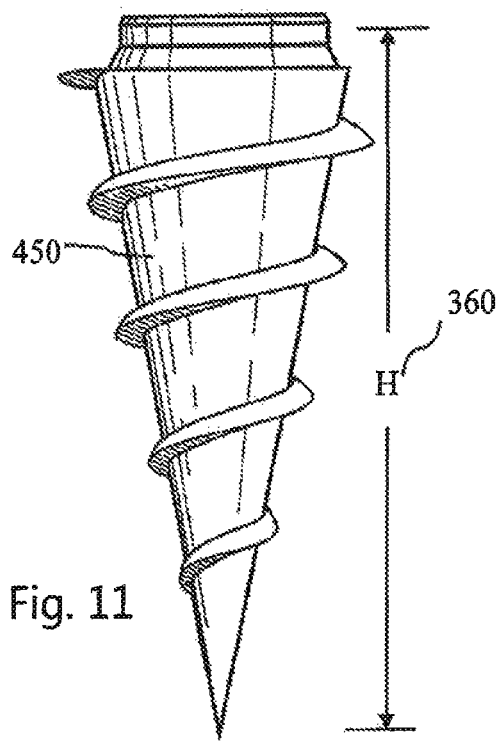
FIG. 11 is a schematic side elevational view of a cone which could be used on stump auger 300 having a thread pitch of 1½ inches.
Figure 12:
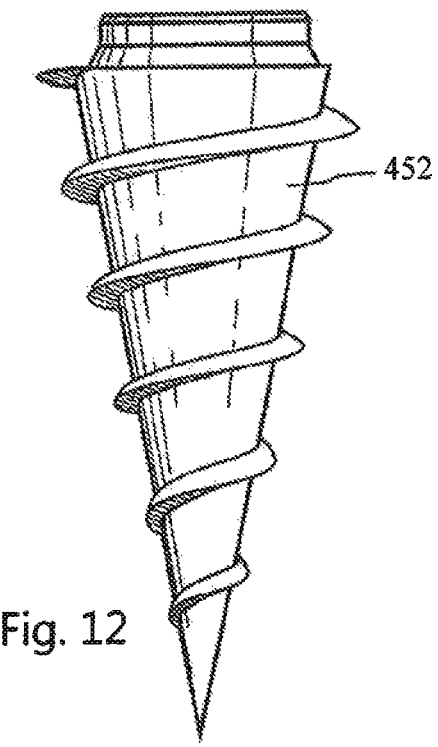
FIG. 12 is a schematic side elevational view of a cone which could be used on stump auger 400 having a thread pitch of 1¼ inches.
Figure 13:
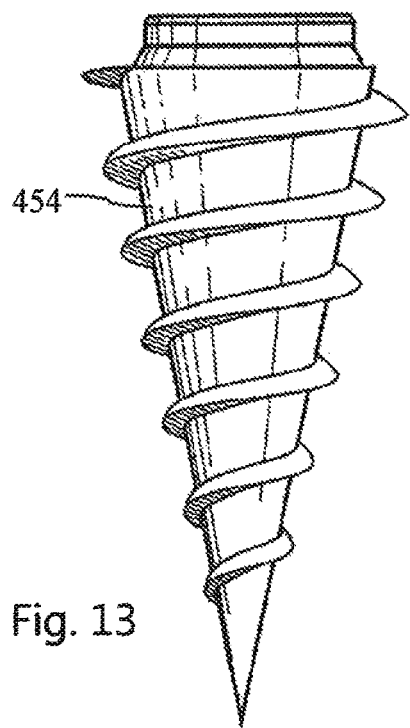
FIG. 13 is a schematic side elevational view of a cone which could be used on stump auger 400 having a thread pitch of 1 inch.
Figure 14:
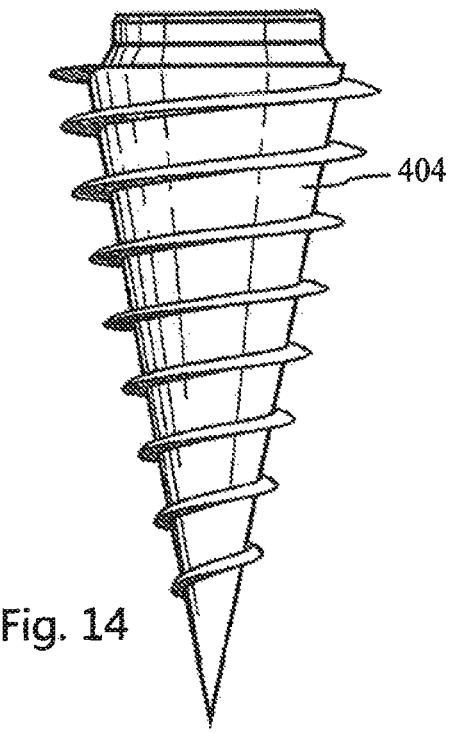
FIG. 14 is a schematic side elevational view of a cone which could be used on stump auger 400 having a thread pitch of ¾ of an inch.

FIG. 11 shows cone 450, FIG. 12 shows cone 452, FIG. 13 shows cone 454, and FIG. 14 shows cone 404.

Figure 15:
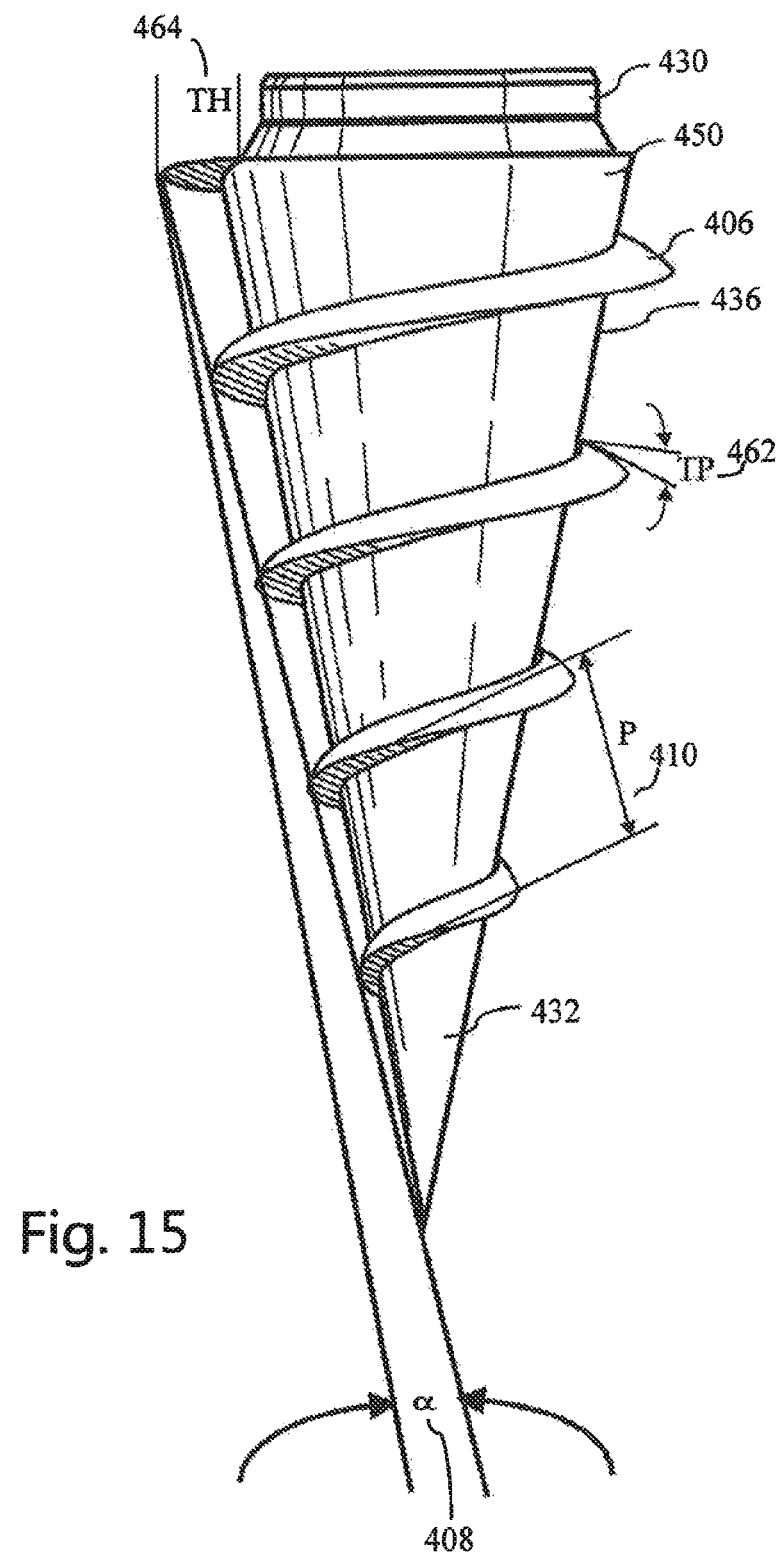
FIG. 15 is a schematic side elevational view of the cone shown in FIG. 11 with further details relating to the cone.

Referring now to FIG. 15 you will see that the cone includes a continuous thread having a thread profile TP 462 threads ranging anywhere from 30 to 50 degrees and preferably 40 degrees and a thread pitch P shown as 410 ranging from 1½ inches to ¾ of an inch and includes a thread taper 408 shown as α (alpha) which can be anywhere from 1 to 3 degrees and preferable is 2 degrees and a thread height 464 having a maximum thread height of a ¾ inch and tapering towards point 462 on a 1 to 3 degree angle and preferably a 2 degree angle. Thread height 464 preferably is a maximum of ⅜ of an inch. FIG. 11 shows cone 450 having a thread pitch of 1½ inches. FIG. 12 shows cone 452 having a thread pitch of 1¼ inches. FIG. 13 shows cone 454 with a thread pitch of 1 inch. FIG. 14 shows cone 404 having a thread pitch of ¾ of an inch. Regardless of the thread pitch there is always a thread taper shown as α 408 wherein the thread height 464 decreases as one moves towards the point 462 of the stump auger 400.

In Use

Stump auger 100 is used by placing point 162 onto approximately the centre of the stump to be removed. Thereafter rotation about vertical axis 151 of stump auger commences and the rotation speed is generally in the range of 8 to 25 revolutions per minute depending upon the size of the stump and the consistency of the wood. Preferably a hydraulic drive not shown is employed to rotate stump auger 100. The torque applied is anywhere from 10,000 to 50,000 foot pounds using a hydraulic pressure of 2000 to 8000 psi. The drive mechanism can be hydraulic, pneumatic or mechanical, however in practice a hydraulic drive has been found to be most cost effective and efficient.

First blades 120 are the first to make contact with the stump. First blades 120 cut into the stump and pull the entire stump auger downwardly into the stump in similar fashion as a wood screw would pull itself into the wood in which it is being threaded into. This is due to the angle and placement of first blades 120 on cone 104.

First blades 120 are oriented around an imaginary helical ridge which normally is called the thread of a screw and has a pitch P shown as 123 of approximately 1.5 inches. In other words one revolution of the stump auger theoretically will pull the stump auger 1.5 inches into the stump. Pitch P 123 can range from 0.5 inches to 4.0 inches but preferably is approximately 1.5 inches.

Each of the first blades 120 is oriented along a thread or helical ridge in such a manner that they all follow along in the same groove or thread therefore creating a strong grip into the stump. The deeper the cone 104 sinks or is threaded into the stump, the more first blades 120 are embedded or threaded into the stump thereby increasing the gripping of cone 104 into a stump.

Cone 104 however differs from a conventional wood screw in that the outer diameter of the cone increases from point 162 to cone top 173, and the thread is discontinuous and consists of individual first blades 120 for effective chip management.

Once second blades 122 make contact with the top surface of a stump it begins to shave off and or chip the wood of the stump thereby beginning the process of removal of wood from the stump.

In the event that the stump is larger in diameter than the cone, the boring bars 140 made of third blades 124 begin to make contact with the stump and begin to grind, chip and shave away the stump as stump auger 100 is being turned.

The applicant has found through testing that the rise angle theta 132 is functional from 10 to 30 degrees and preferably around 20 degrees as well the blade tilt angle 144 which is third blade angle shown as gamma 142 in FIG. 3 is functional from 5 to 15 degrees and preferably is 10 degrees.

Boring bar 140 is shown made of 5 third blades 124 oriented in staggered fashion having an offset 138. The thickness T 136 of each of the blades at the thickest point is 136 and they taper on one end to a blade edge 146 which can be sharpened. The offset 138 typically is one half thickness T 136 of each blade and each of third blades 124 are oriented along the bar axis 130 thereby creating boring bar 140.

Fourth blades 126 are oriented with their blade edge oriented along a vertical axis. Fourth blades 126 typically will cut roots that may be emanating from the stump, once stump auger 100 reaches the root level of the stump.

Struts 150 are rigidly attached at one end to fourth blades 126 and to the other end to main shaft 102. Struts 150 serve to stabilize and reinforce boring bar 140 and provide the necessary rigidity and strength for stump auger 100.

Flange 110 includes apertures 160 for mounting it to a drive mechanism not shown. The drive mechanism could be any known drive unit in the art including hydraulic drive motors and any other mechanical hydraulic pneumatic and hydro-pneumatic drives that are available. The stump auger is rotated at anywhere between 5 and 25 revolutions per minute and preferably around 14-16 revolutions per minute depending upon the stump size and the wood species.

In practice the applicant has found that anywhere between 6 to 20 total revolutions of the stump auger will completely grind away an existing stump. The number of revolutions will depend upon the height and diameter of the stump as well as the consistency of the wood species.

Figure 6:
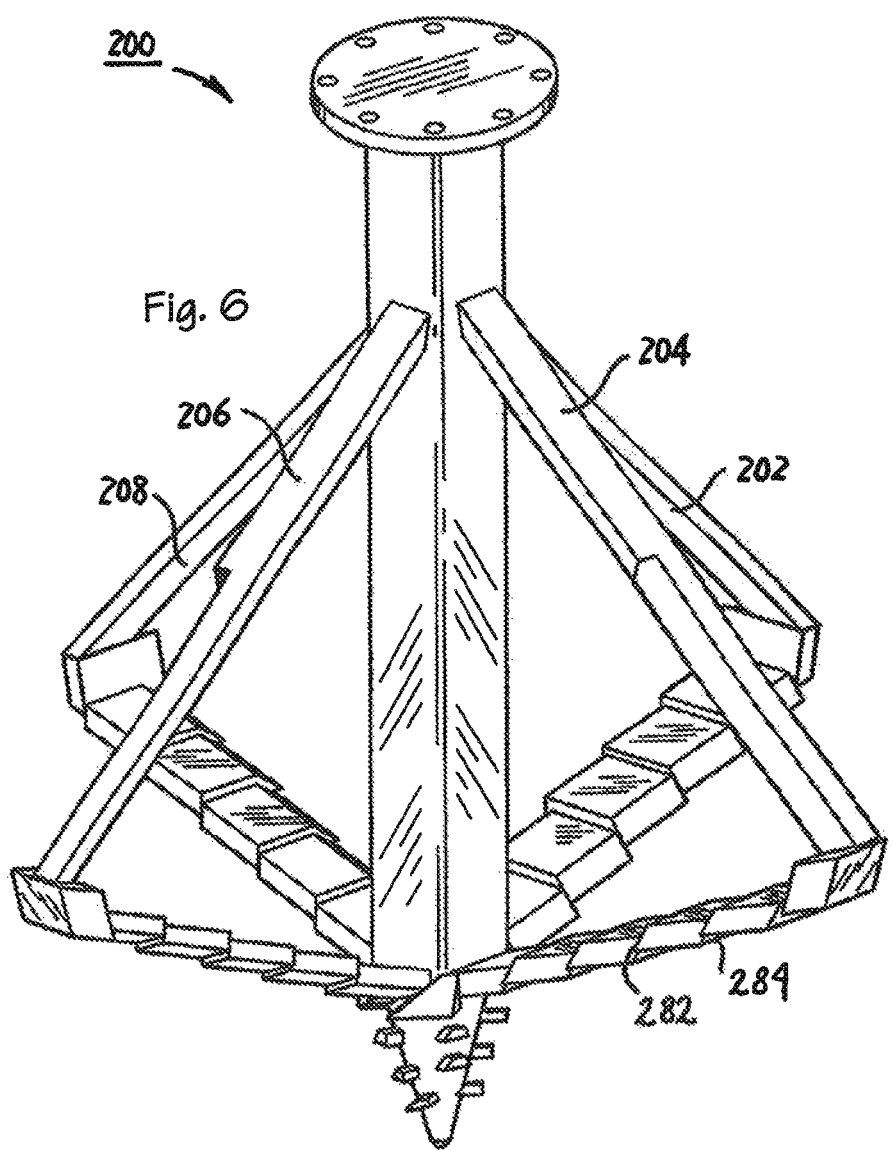
FIG. 6 is a front side perspective view of an alternative embodiment of a stump auger showing four arms.

Referring now to FIG. 6 which shows stump auger 200 an alternate embodiment of stump auger 100. The major difference between stump auger 200 and stump auger 100 is that stump auger 200 has four arms namely first arm 202, second arm 204, third arm 208, and fourth arm 206.

Stump auger 300 and alternate embodiment stump auger 100 operates in almost identical fashion to stump auger 100 other than the fact that a modified cone 304 is used rather than cone 104 on stump auger 100.

Stump auger 300 includes a reamer blade 350 which is not found on stump auger 100 and as well second blades 322 are somewhat larger as are first blades 320

Reamer blade 350 includes a reamer cavity 360 for channeling away wood chips up and out of the cone and upper blade to the bottom end 112 of main shaft 102. This helps in removal of wood chips at a faster rate.

Additionally using larger first blades 320 as well as larger second blades 322 result in stronger gripping and turning force of the auger into the stump.

Review of Prior Art—The Chapman Patent

Figure 17:
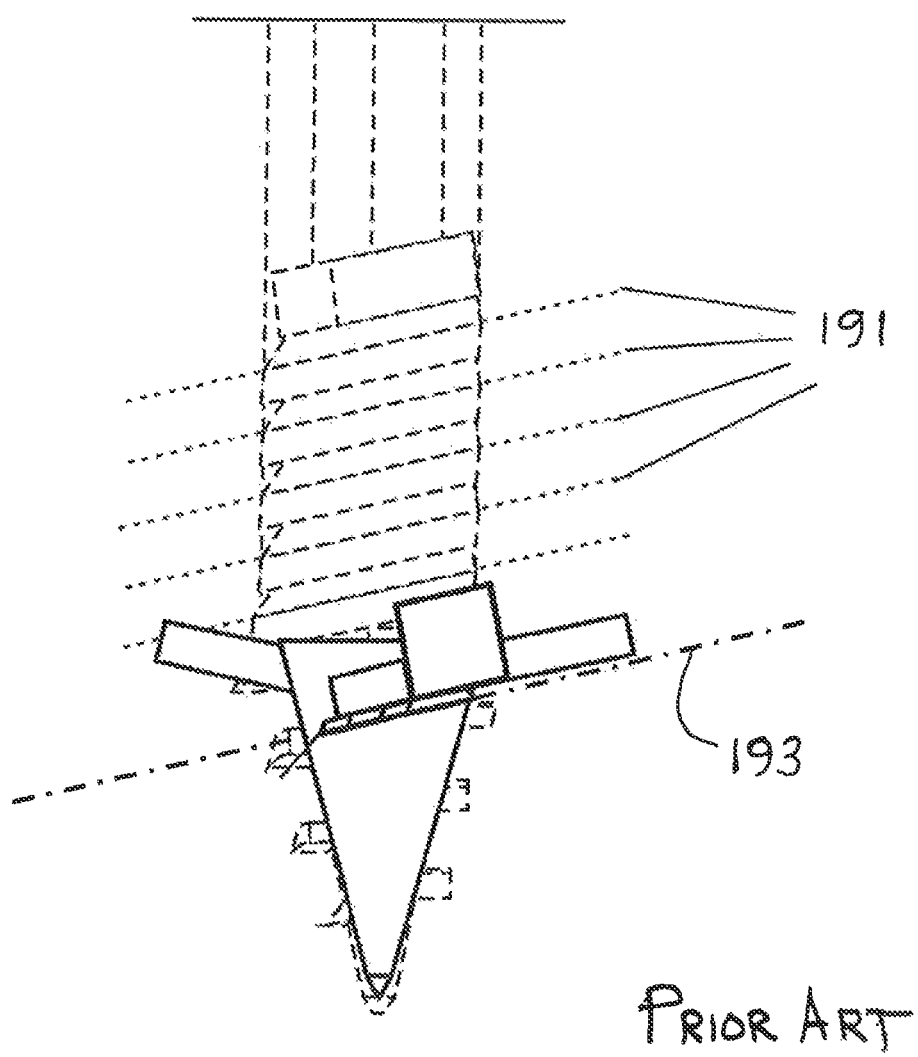
FIG. 17 is a schematic right end side elevational view of the prior art taken from FIG. 2 of Chapman US patent application 2013/0056113 which is superimposed onto our FIG. 3 above.
Figure 18:
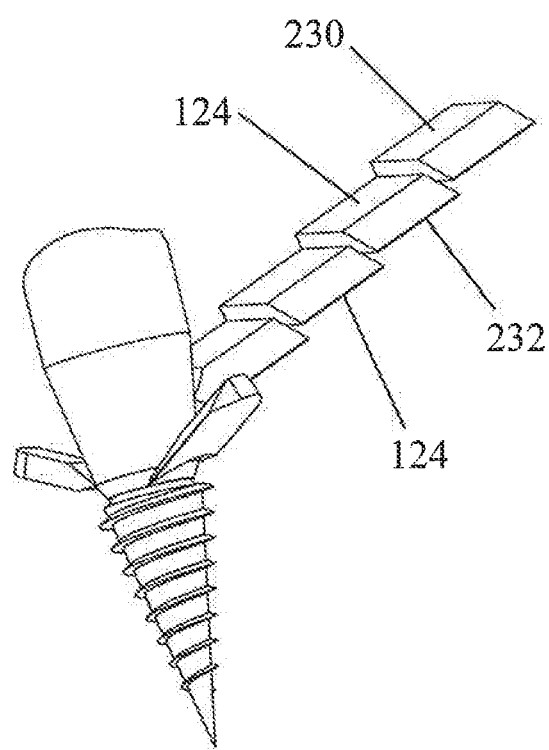
FIG. 18 is a partial schematic isometric view of the arrangement of the third blades 124 of the present concept.

The closest piece of prior art likely is US patent application 2013/0056113 to Chapman hereinafter referred to as "Chapman" Referring to FIG. 16 herein Chapman FIG. 18 is superimposed onto our FIG. 1 to illustrate the differences between Chapman and the presently invented design. Referring to FIG. 17 herein, Chapman FIG. 2 is superimposed onto our FIG. 3 to illustrate the differences between Chapman and the presently invented design.

Figure 16:
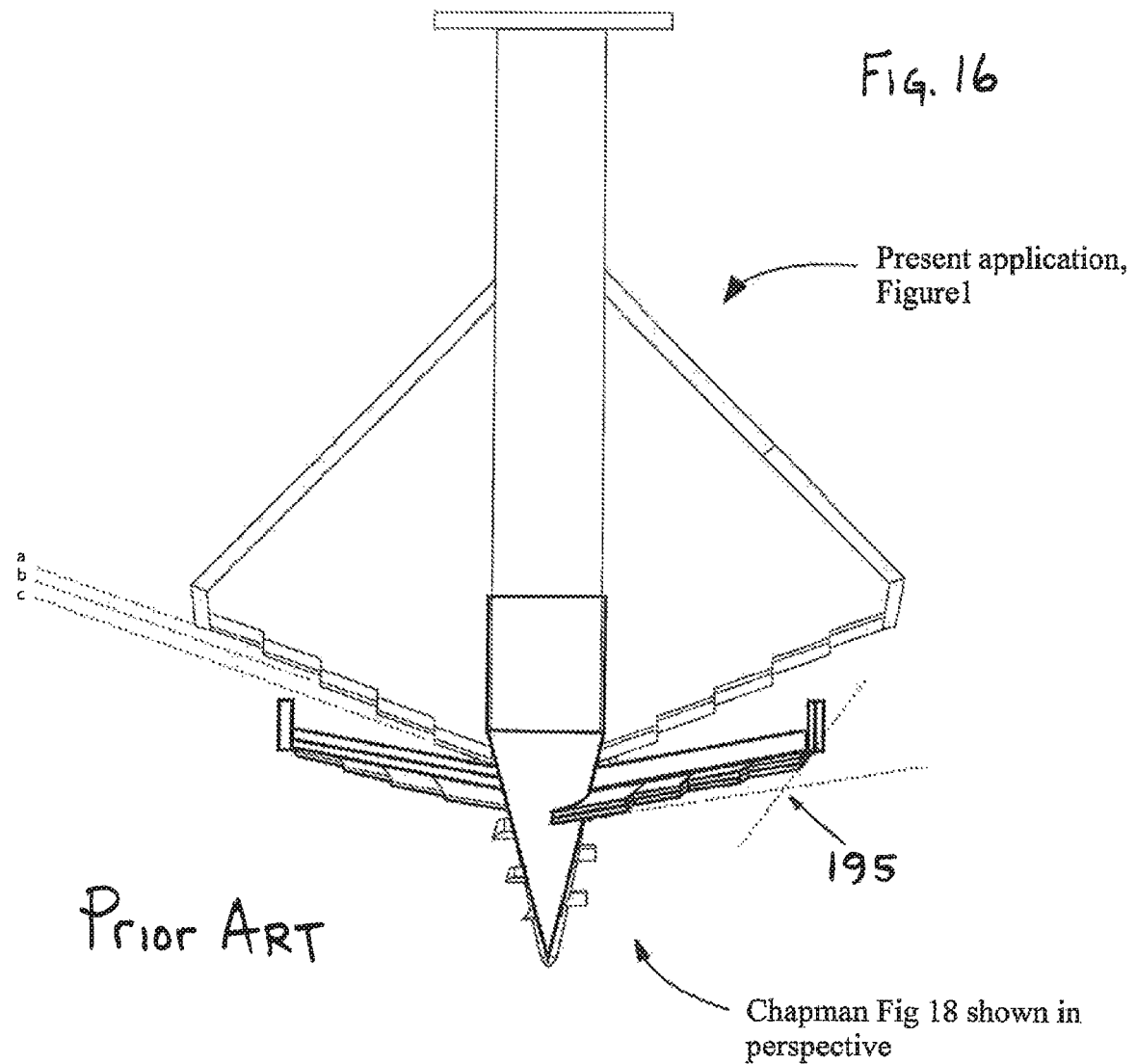
FIG. 16 is a schematic front side elevational view of the prior art taken from FIG. 18 of Chapman US patent application 2013/0056113 which is superimposed onto our FIG. 1 above.

FIG. 16 clearly depicts in darker solid lines the Chapman design wherein the "cutting blades" and "cutting edges" are clearly coplanar 195 compared to the present design wherein the "cutting blades" equivalent our third blades 124 reside on multiple planes on progressively higher along the Z axis. Referring now to FIG. 7 as well the bottom surface of the first third blade lies along a first plane A 161 and the bottom surface of the second third blade lies along a second plane B 163 such that plane B is a distance D 181 vertically higher along the vertical z-axis, and wherein successive third blades lie along successive planes each higher along the vertical z-axis.

FIG. 17 is a side end elevational view showing depicting the Chapman device (taken from Chapman FIG. 2) in dark lines superimposed over the present concept again clearly showing the "cutting blades" extending along a single plane 193 in comparison to the present device wherein the third blades 124 reside on successively higher planes relative to the Z axis shown in dashed lines 191.

FIG. 18 depicts a portion of the present invention at an oblique angle which helps to visually see the third blades 124 residing on multiple planes.

Clearly the "cutting blades" 18 depicted in Chapman FIGS. 1, 2, 3, 4, 5, 6, 11, 12, 24 and 25 are all co-planar meaning they reside in a single plane. "Side views" of Chapman FIGS. 2 and 12 make this perfectly clear. Chapman FIGS. 1, 2, 3, 4, 5, 6, 11, 12, 24 and 25 are also the only drawings in Chapman that can provide any kind information as to the structure of the "cutting blades" relevant to the Z or vertical axis direction which is parallel to the main shaft shown as 151 in our FIG. 1

Paragraph [0065] of Chapman indicates "cutting edges 18a, 20a, and 25a may comprise many different configurations and refers to FIGS. 8-9,12-19, 24,25 and 27". Note Chapman is not referring to the "cutting blades". In Chapman the "cutting edges" are somehow connected to the "cutting blades". Chapman in paragraph [0065] describes the "cutting edges" as smooth or step like smooth cutting edge or may comprised layered surfaces each comprising a surface capable of cutting into the stump. Chapman depicts "step like cutting edges" in for example FIGS. 8, 9, 11, 12, 13, 15, 16, and 18 which are step like in the x-y plane ie; coplanar and "layered surfaces" in FIG. 20 again in the x-y plane ie; coplanar. Any other interpretation is conjecture and unsupported by the Chapman disclosure. In accordance with the Figure descriptions in Chapman these (8, 9, 11, 12, 13, 15, 16, 18 and 20) are all "top views" ie downward along the Z axis since the shaft is a perfect circle except for 9 which is a bottom view upward along the Z axis. FIGS. 12 and 25 which are side views and 27 is not relevant. The top views provide no information as to the orientation and structure of the cutting blades or the cutting edges in the Z direction since these are all views in the X-Y plane. In regard to paragraph [00065] only FIGS. 12 and 25 provide any information about the orientation and structure of the cutting blades or the cutting edges in the Z direction and again confirm that they are coplanar namely all reside on a common plane.

There are only a few views which show the cutting blades 18 and cutting edges 18a from which one can glean some information in regard to the structure of the blade and cutting edges in the Z or vertical axis. The isometric or perspective and "side views" that provide some information in regard to the cutting blades 18 and or cutting edges 18a in the vertical or Z axis are FIGS. 1-6, 11, 12 and 25. These all confirm that the cutting blades or the cutting edges are all coplanar. There is no evidence within Chapman to support a finding that cutting blades or cutting edges could be anything other than coplanar.

would be FIG. 12 and FIG. 25 of Chapman referenced

First of all I note that in FIGS. 12 and 25 there is no mention of cutting edges 18a, 20a and or 25a which the inventor is describing as a smooth edge or a series of step-like smooth cutting edges in paragraph [0065]. 20a is only referred to in FIGS. 8 and 9 which again are top views however by looking at FIG. 6 it is possible to glean that 20 is a vertical blade and 20a is vertical cutting edge and is not applicable to the third blades as claimed.

Additionally paragraph [0057] of Chapman indicates that "upper cutting blades" comprise one or more cutting edges 18a. This is depicted for example in FIG. 14 or 20 top views showing multiple edges in the x-y plane.

Development History

I built my first prototype which had a step blade design similar to the design presently depicted in the application in or around August of 2012 and tested the unit with surprising success. The drawbacks with my early prototype is that it was very heavy and was in need of refinement in terms of reducing the weight and making the unit look more aesthetically pleasing.

At this point I hired an engineer on contract to refine my initial design and he convinced me that he could make and improve upon my design by using a blade very similar to what is depicted in the Chapman patent Publication 2013/0056113. We went to the single plane blade and by March of 2013 we had our first prototype ready for testing. Testing proved that the design was not effective. The blade failed when it was approaching maximum stress when the blade becomes submerged under the ground as it continues to destroy the stump. We were not able to make the single plane design work reliably since the blade design could not withstand the stresses of the destruction process.

I went back to my original step design in around May of 2013 and the subsequent designs with the step blades were far superior to the Chapman style blades and passed most of the tests we put them through and proved to be far more rugged and effective in stump destruction and were not prone to catastrophic failure as the previous design.

To the best of my knowledge our vertical stump auger is the only vertically rotating stump auger commercially available on the market today and competes directly with the horizontal drum style and or horizontal disc style high speed rotating carbide wheels which are the current mainstream pieces of equipment used for stump destruction.

As far as I know the Chapman style blade never gained commercial success likely because of the same problems that I encountered when testing a similar blade namely that the design inherently does not provide enough strength and endurance for the rigors of the stump destruction process.

It should be apparent to persons skilled in the arts that various modifications and adaptation of this structure described above are possible without departure from the invention the scope of which defined in the appended claims.

I claim:

1. A stump auger for cutting and destroying a tree stump, the stump auger comprising:
    a) a main shaft with a top end for coupling to a drive mechanism for turning the shaft about a vertical axis;
    b) the main shaft further comprising a cone, a base of the cone being connected to a bottom end of the main shaft;
    c) the stump auger further includes at least two boring bars connected to the main shaft, each boring bar includes at least two third blades each includes a blade edge on a front face for shaving, cutting and chipping the tree stump as the stump auger is rotated about the vertical axis and penetrates the tree stump; and
    d) a strut associated with each boring bar, each strut extending between, and rigidly secured to, an outer end of its associated boring bar and the main shaft proximate a top end of the main shaft to stabilize and provide rigidity to the associated boring bar, each strut comprising a lower blade portion for additional cutting action, one end of each strut that is adjacent the lower blade portion being rigidly secured to the outer end of its associated boring bar in fixed relationship to prevent movement therebetween, an opposed end of each strut being rigidly secured to the main shaft proximate the top end of the main shaft in fixed relationship thereto to prevent movement therebetween, the struts positioned in a fixed position relative to the main shaft at an angle between 15 and 60 degrees, the main shaft, the struts and the boring bars each being fixed in position and rigid relative to one another;

wherein each third blade includes a planar bottom surface spaced from a planar top surface, an inner face spaced from an outer face, the front face spaced from a back face, and wherein the outer face of the first third blade abuts at least partially with the inner face of the second third blade such that the bottom surface of the first third blade lies along a first plane (A) and the bottom surface of the second third blade lies along a second plane (B) such that plane (B) is a distance (D) vertically higher along the vertical z-axis, and wherein successive third blades lie along successive planes each higher along the vertical z-axis;

wherein the outer face and inner face of each third blade are rigidly connected together; and wherein the struts accommodate high torque loading of the boring bars to prevent displacement of the boring bars relative to the main shaft.

2. The stump auger claimed in claim 1 wherein each successive third blade is stepped higher along the vertical z-axis relative to the adjacent third blade, a preselected distance not less than one quarter of the thickness of the third blade and not more than three quarters of the thickness of the third blade.

3. The stump auger claimed in claim 2 wherein the third blades are oriented parallel along a bar axis having a bar angle theta selected to fall between 10 and 30 degrees relative to horizontal.

4. The stump auger claimed in claim 2 wherein the third blades are stepped at an offset of ½ a thickness (T) of the third blade.

5. The stump auger claimed in claim 2 wherein the third blades include a chamfered front face wherein the chamfer terminating at the blade edge and the bottom surface of the third blades tilted at a third blade angle gamma, wherein the third blade angle gamma ranges between 5 and 15 degrees relative the horizontal.

6. The stump auger claimed in claim 5 wherein the third blade angle gamma is 10 degrees relative the horizontal.

7. The stump auger claimed in claim 1 further including fourth blades attached to the outer end of the boring bar between the boring bar and the lower blade portion of the corresponding strut, fourth blades include a blade edge mounted substantially vertically along the z-axis direction.

8. The stump auger claimed in claim 1 wherein each strut makes an angle delta of between 15 and 60 degrees relative the main shaft.

9. The stump auger claimed in claim 1 wherein the thread includes a maximum height proximate the cone top, and wherein the thread tapers towards the cone bottom.

10. The stump auger claimed in claim 9 wherein the thread taper is defined by angle alpha, the angle between the cone outer surface and a line drawn joining the thread apexes, angle alpha is selected to fall between 1 and 3 degrees.

11. The stump auger claimed in claim 1 further including second blades rigidly attached proximate the cone top, the second blades for grinding chipping and cutting the stump as the cone penetrates into the stump.

12. The stump auger claimed in claim 1 further including second blades rigidly attached proximate the bottom end of main shaft, the second blades for grinding chipping and cutting the stump as the cone penetrates into the stump.

13. The stump auger claimed in claim 1 further including at least two additional boring bars connected to the main shaft, and an additional strut associated with each additional boring bar.

14. The stump auger claimed in claim 1, wherein the cone includes a reamer blade with a cutting edge extending along a side of an outer surface of the cone and extending radially from the base to an apex of the cone.

15. The stump auger claimed in claim 14, wherein the reamer blade further includes a reamer cavity that extends adjacent and parallel to the cutting edge, and extends radially from the base to the apex of the cone.

16. The stump auger claimed in claim 14, wherein the cone includes two first blades extending from an opposed side of the outer surface of the cone, the first blades arranged from the base to the apex of the cone.

17. A stump auger for removing a tree stump, the stump auger comprising:
a) a main shaft with a top end for coupling to a drive mechanism for turning the shaft about a vertical axis;
b) the main shaft further comprising a cone, a base of the cone being connected to a bottom end of the main shaft;
c) at least two boring bars, each boring bar including third blades mounted in stepped offset side by side fashion wherein an inner face of one third blade abuts an outer face of an adjacent third blade, the third blades oriented parallel to a boring bar axis which defines a boring bar angle theta relative the horizontal, the third blades including a blade edge for shaving, grinding and chipping the tree stump as the stump auger is rotated about the vertical axis; and
d) a strut associated with each boring bar for stabilizing and providing rigidity to the associated boring bar, each strut extending between, and rigidly secured to, an outer end of its associated boring bar and the main shaft proximate a top end of the main shaft, each strut comprising a lower blade portion for additional cutting action, one end of each strut that is adjacent the lower blade portion being rigidly secured to the outer end of its associated boring bar in fixed relationship to prevent movement therebetween, an opposed end of each strut being rigidly secured to the main shaft proximate the top end of the main shaft in fixed relationship thereto to prevent movement therebetween, the struts positioned in a fixed position relative to the main shaft at an angle between 15 and 60 degrees, the main shaft, the struts and the boring bars each being fixed in position and rigid relative to one another;

wherein the struts accommodate high torque loading of the boring bars to prevent displacement of the boring bars relative to the main shaft.

18. A stump auger for cutting and destroying a tree stump, the stump auger comprising:
a) a main shaft with a top end for coupling to a drive mechanism for turning the shaft about a vertical axis;
b) the main shaft further comprising a cone, a base of the cone being connected to a bottom end of the main shaft;
c) the cone having:
a reamer blade with a cutting edge extending along a side of the outer surface of the cone, and extending radially from the base to the apex of the cone,
a reamer cavity extending parallel to the cutting edge from the base to the apex of the cone, and two first blades extending from an opposed side of the outer surface of the cone, the two first blades arranged from the base to the apex of the cone;

d) the stump auger further includes at least two boring bars connected to the main shaft, each boring bar includes at least two third blades each includes a blade edge on a front face for shaving, cutting and chipping the tree stump as the stump auger is rotated about the vertical axis and penetrates the tree stump; and e) a strut associated with each boring bar, each strut extending between, and rigidly secured to, an outer end of its associated boring bar and the main shaft proximate a top end of the main shaft to stabilize and provide rigidity to the associated boring bar, each strut comprising a lower blade portion for additional cutting action, one end of each strut that is adjacent the lower blade portion being rigidly secured to the outer end of its associated boring bar in fixed relationship to prevent movement therebetween, an opposed end of each strut being rigidly secured to the main shaft proximate the top end of the main shaft in fixed relationship thereto to prevent movement therebetween, the struts positioned in a fixed position relative to the main shaft at an angle between 15 and 60 degrees, the main shaft, the struts and the boring bars each being fixed in position and rigid relative to one another;

wherein each third blade includes a planar bottom surface spaced from a planar top surface, an inner face spaced from an outer face, the front face spaced from a back face, and wherein the outer face of the first third blade abuts at least partially with the inner face of the second third blade such that the bottom surface of the first third blade lies along a first plane (A) and the bottom surface of the second third blade lies along a second plane (B) such that plane (B) is a distance (D) vertically higher along the vertical z-axis, and wherein successive third blades lie along successive planes each higher along the vertical z-axis;

wherein the outer face and inner face of each third blade are rigidly connected together; and wherein the struts accommodate high torque loading of the baring bars to prevent displacement of the boring bars relative to the main shaft.

\* \* \* \* \*